ELECTRICAL CONTROL APPARATUS

Filed July 9, 1954

*INVENTORS.*
ROBERT J. EHRET
WARREN MOORE JR.
*BY* Arthur H. Swanson
ATTORNEY.

United States Patent Office 2,778,942
Patented Jan. 22, 1957

2,778,942

ELECTRICAL CONTROL APPARATUS

Robert J. Ehret, Philadelphia, and Warren Moore, Jr., North Hills, Pa., assignors to Minneapolis-Honeywell Regulator Company, Minneapolis, Minn., a corporation of Delaware Application July 9, 1954, Serial No. 442,236
10 Claims. (Cl. 250—36)

A general object of the present invention is to provide an improved vane controlled oscillator which will produce an output current which varies proportionally with the movement of an adjustable vane. A more specific object of the present invention is to provide an improved vane controlled oscillator having a transistor as the oscillation sustaining element of the circuit with the average current flow to the transistor being varied in accordance with the tuning of a reactive element in the circuit in accordance with variations in magnitude of a controlling variable.

A conventional form of vane controller comprises a galvanometer in the form of a deflection coil which moves in a magnetic field. The deflection coil may be energized by a suitable input signal source, such as a thermocouple, whereby to deflect the coil in accordance with the input signal. The coil may in turn carry a vane which is effective to change the operation of an associated electrical circuit. This change is generally reflected in a current flow change which may be used to actuate a control relay or some other such device. In some forms of controllers, it is desirable to have an output signal current which varies proportionally with the motion of the controlling vane. The present invention is concerned with the latter type of proportional current vane controller.

A preferred form of this proportional current type vane controller is one where the vane sensing means forms a part of an oscillator with the oscillator having its current flow varied in accordance with the movement of the vane. Such an apparatus may be made to be highly sensitive to minute changes in vane position and with a minimum of loading of the vane by the circuit. The oscillator used in the present invention incorporates a transistor as the oscillation sustaining means. In order to use a transistor in an oscillator circuit of the present type, it is necessary to arrange the circuit components in such a manner as to take maximum advantage of the transistor operating characteristics.

One of the problems associated with using transistors in an oscillator circuit is the obtaining of a suitable operating bias for the transistor. This operating bias must be effective to initiate oscillations of the circuit and serve to maintain oscillations once they have been started. In addition, the circuit must be arranged so that a sloping characteristic of output current may be obtained with the adjustment of the oscillator circuits so that the output current will vary proportionally with the motion of the controlling vane.

It is therefore a more specific object of the present invention to provide an improved vane controlled oscillator employing a transistor having improved means for supplying a biasing signal to the transistor of the oscillator circuit.

Another object of the present invention is to provide an improved vane control oscillator having a transistor with a resonant circuit in the base-collector electrode path of the transistor and an oscillation sustaining feedback connection point in said path to the emitter electrode of the transistor.

A further more specific object of the present invention is to provide an improved transistor oscillator having a resonant circuit in the base-collector electrode path of the transistor, an inductive feedback to the transistor emitter, and an asymmetrically conductive impedance in the base circuit of the transistor as a means for establishing a biasing potential for the transistor.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described preferred embodiments of the invention.

Figure 1:
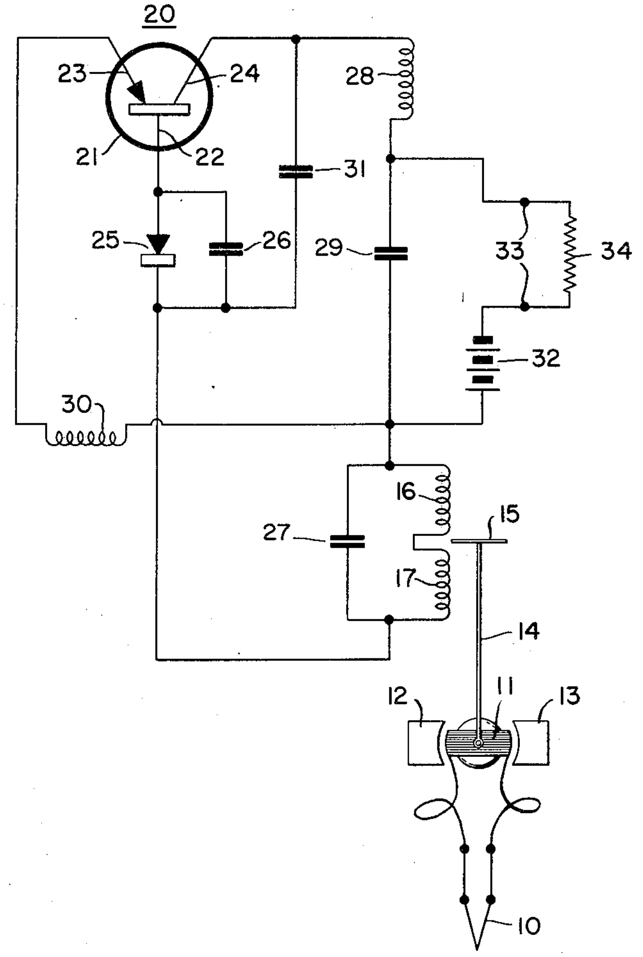
Fig. 1 shows a preferred form of circuit utilized in the present controller.

Referring first to Fig. 1, the numeral 10 represents a thermocouple or other similar signal producing device which is connected to supply a driving signal to a galvanometer coil 11. This coil 11 is placed for rotation in a magnetic field defined by a pair of magnetic members 12 and 13. The coil 11 carries an arm 14 and a vane 15 at its outer extremity.

Figure 2:
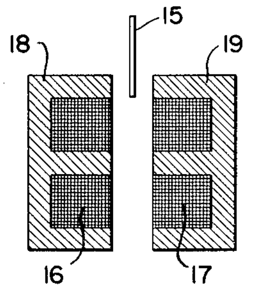
Fig. 2 shows a detail of the vane coils utilized in the apparatus shown in Fig. 1.

The vane 15 is adapted to cooperate with a pair of coils 16 and 17, said coils 16 and 17 being shown in cross sectional detail in Fig. 2 as coils formed in a ferramic core structure 18 and 19. Vane 15 is adapted to move between the coils 16 and 17 and so as to minimize the coupling when the vane is between the coils and also decreases the total inductance by the pressure of the vane adjacent each of the coils.

The vane coils 16 and 17 form the controlling means for an oscillator circuit 20. The circuit 20 comprises a transistor 21 having a base electrode 22, an emitter electrode 23, and a collector electrode 24. Connected between the coil 17 and the base electrode 22 is a diode 25 having a condenser 26 in parallel therewith. In parallel with the coils 16 and 17 is a further condenser 27. Connected to the collector electrode 24 is a coil 28 which has its opposite end connected to a further condenser 29. A feedback connection to the emitter electrode 23 includes a coil 30. Also a part of the oscillator circuit is a condenser 31 which is connected between a collector electrode 24 and the diode 25.

Power is supplied to the oscillator 20 by a direct current power source 32 having a pair of output terminals 33 in series therewith. These output terminals 33 may be connected to any suitable load device represented by a resistor 34.

Considering the operation of the apparatus, it should first be noted that the diode 25 is positioned in the base circuit in such a direction that it causes the collector-base current flow, normally designated as $I_{c0}$ to see a high impedance in the base circuit and therefore the current flow will be in the emitter circuit which will establish a biasing current within the transistor semiconductor material. This biasing current is sufficient to initiate oscillations in the circuit 20. The initial biasing current flow circuit may be traced from the positive terminal of the battery 32 through coil 30, emitter 23, collector 24, coil 28, and resistor 34 back to the negative terminal of the battery 32.

Figure 3:
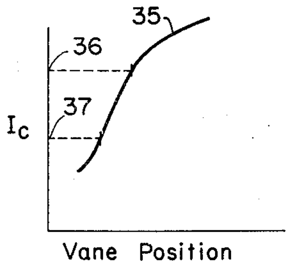
Fig. 3 shows an explanatory diagram for the operation of Fig. 1.

As soon as the oscillations are started, there will be an alternating current flowing in the circuit that may be traced from the collector electrode 24 through coil 28, condenser 29, coil 16, coil 17, and condenser 26 back to the base electrode 22. The coil 28, condenser 29, and coils 16 and 17 have the condenser 31 in parallel therewith and form the output circuit for the oscillator. The coil 30 which connects the top of coil 16 back to the emitter 23 is effective to establish a regenerative feedback to cause the oscillator to oscillate. The relative phase relationships between the voltage on the upper terminal of coil 16 and the current in the emitter circuit are preferably selected so that the circuit will be operating down the slope of the oscillator characteristic curve represented in Fig. 3 by the curve 35. When the vane 15 is in the position shown upon the drawing where the inductance of the coils 16 and 17 is relatively high, the circuit will be oscillating with relatively high intensity oscillations and there will be a resultant high collector current such as shown at point 36 in Fig. 3. This current will be flowing through the load impedance 34. As the vane 15 is moved in between the coils 16 and 17, the inductance of the coils 16 and 17 will be decreased so that there will be a smaller impedance drop across the coils 16 and 17. This will mean that the feedback signal available at the upper terminal of coil 16 will be smaller and there will be a smaller current flow in the emitter electrode 23. This point may well be represented by the point 37 on the collector current axis of the graph shown in Fig. 3. When the vane 15 is moved out from between the coils 16 and 17, the current variation will change in accordance with the curve shown in Fig. 3 and the change will be proportional to the movement of the vane 15 relative to the coils 16 and 17.

Since the transistor 21 is preferably of the junction type, the emitter current will be greater than the collector current. The excess of emitter current over collector current passes through the base electrode circuit and though the diode 25. In the absence of the diode 25, the emitter current will normally charge the condenser 26 so that a positive bias signal will develop on the base electrode 22. This positive bias will have the effect of tending to prevent the collector current from increasing appreciably as the intensity of oscillation increases. The presence of the diode during oscillation is to prevent the build up of the voltage on condenser 26 and cause the net base circuit impedance to be relatively low in magnitude. Thus, it is possible to achieve an output current flow that varies proportionally with vane position. The relative rate of change of reactance of the control element at a given frequency will be increased by partially parallel tuning it with condenser 27. This will tend to increase the sensitivity of the controller.

It will be readily apparent that other circuit modifications may be made to vary the characteristic curve of the oscillator and consequently the output current change expected with a predetermined change in the position of the vane 15 relative to the coils 16 and 17.

While, in accordance with the provisions of the statutes, there has been illustrated and described the best forms of the embodiment of the invention known, it will be apparent to those skilled in the art that changes may be made in the forms of the apparatus without departing from the spirit of the invention as set forth in the appended claims and that in some cases certain features of the invention may be used to advantage without a corresponding use of other features.

Having now described our invention, what we claim as new and desire to secure by Letters Patent is:

1. In a controller having an output which varies proportionally with an input variable, the combination comprising, a transistor having a base electrode, emitter electrode, and collector electrode, a resonant reactive circuit connected in the collector-base circuit, a movable member positioned in impedance adjusting relation adjacent to a reactive element of said resonant circuit, a regenerative feedback connection from a tap on said resonant circuit to said emitter electrode, said feedback connection providing a signal to initiate circuit oscillations, and an inductive element connected in said feedback circuit so that when said reactive element is tuned, the intensity of oscillations will vary proportionally with the movement of said movable member.

2. An electrical controller comprising, a transistor oscillator circuit including a transistor having a base electrode, an emitter electrode, and a collector electrode, said oscillator further including a resonant circuit connected in the base-collector circuit and having a reactive element which is adjustable in accordance with the changes in magnitude of a variable, a non linear impedance connected to said base electrode and in series with said resonant circuit, and a reactive feedback connection from a point on said resonant circuit to said emitter electrode, a source of power connected to the base-collector circuit, and output load terminals connected in series with said source of power.

3. An electrical apparatus comprising, a transistor having a base electrode, emitter electrode, and collector electrode, a reactive circuit comprising in series a parallel inductor-capacity circuit and an inductor connected in the base-collector circuit of said transistor, means for variably adjusting the reactance of one of said circuits, a reactive regenerative feedback connection from a junction point on said series connected circuits to said emitter electrode, said resonant circuit and said feedback connection to said transistor forming an oscillating circuit, a non linear biasing impedance connected to said base electrode in said series circuit, a source of power connected to the base-collector circuit, and a pair of output terminals in series with said power source.

4. A vane controlled oscillator having an output current varying proportionally with the movement of a vane comprising, a transistor having a base electrode, emitter electrode, and collector electrode, a non linear impedance connected to said base electrode, a condenser in parallel therewith, a vane controlled coil having a second condenser in parallel therewith, a second coil, means connecting said non linear impedance, said vane controlled coil, and said second coil in the order named in series between said base electrode and said collector electrode, and a third coil connected between said emitter electrode and the junction of said second coil and said vane controlled impedance coil.

5. An oscillator as defined in claim 4 wherein a third condenser is connected between said vane controlled coil and said second coil, and a source of power having load terminals in series therewith connected across said third condenser.

6. An oscillator as defined in claim 4 wherein there is a fourth condenser connected across said vane controlled coil and said second coil.

7. A vane controlled oscillator for producing an output current which varies proportionally with the motion of a vane comprising a transistor having a base electrode, emitter electrode and collector electrode, a vane controlled reactive circuit connected as the output circuit between said base electrode and said collector electrode, biasing means connected to said base electrode in series with said reactive circuit, and a regenerative feedback connection from a tap on said output circuit to said emitter electrode, said connection between said output circuit including a single reactive element in the form of an inductance.

8. Apparatus as defined in claim 7 wherein a diode is connected to said base electrode with said reactive circuit to present a high impedance to collector electrode current when said oscillator is not oscillating.

9. Apparatus as defined in claim 8 wherein said diode has a condenser connected in parallel therewith.

10. An oscillator for producing an output current which varies proportionally with the position of a control member comprising a transistor having a base electrode, an emitter electrode, and a collector electrode, a reactive circuit sensitive to the position of said member and connected between said collector electrode and one of said other electrodes, a regenerative feedback circuit connected between a point on said reactive circuit and the other of said other electrodes, and a non linear biasing element connected in the circuit between said base electrode and said collector electrode, said last named element comprising a diode which is effective to enhance the initiation of oscillations in said oscillator.

References Cited in the file of this patent

UNITED STATES PATENTS 2,234,184 MacLaren -------------- Mar. 11, 1941

OTHER REFERENCES

Article: "Duality as a Guide in Transistor Circuit Design" by Wallace et al.; from Bell Telephone System Monograph, 1874; Bell System Technical Journal, vol. 30, pages 381 to 417, April 1951.